(12) United States Patent
Dong et al.

(10) Patent No.: US 9,178,349 B2
(45) Date of Patent: Nov. 3, 2015

(54) METHOD AND SYSTEM FOR ARCHITECTURE, CONTROL, AND PROTECTION SYSTEMS OF MODULAR STACKED DIRECT CURRENT SUBSEA POWER SYSTEM

(71) Applicant: General Electric Company, Schenectady, NY (US)

(72) Inventors: Dong Dong, Schenectady, NY (US); Rixin Lai, Clifton Park, NY (US); Song Chi, Clifton Park, NY (US); Ranjan Kumar Gupta, Schenectady, NY (US); Di Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 8 days.

(21) Appl. No.: 14/024,315

(22) Filed: Sep. 11, 2013

(65) Prior Publication Data

US 2015/0070802 A1    Mar. 12, 2015

(51) Int. Cl.
| | |
|---|---|
| *H02H 3/16* | (2006.01) |
| *H02M 1/00* | (2007.01) |
| *H02J 3/36* | (2006.01) |
| *H02M 11/00* | (2006.01) |
| *E21B 41/00* | (2006.01) |

(52) U.S. Cl.
CPC .. *H02H 3/16* (2013.01); *H02J 3/36* (2013.01); *H02M 1/00* (2013.01); *H02M 11/00* (2013.01); *E21B 41/00* (2013.01)

(58) Field of Classification Search
CPC .......... H02H 3/16; H02M 1/00; H02M 11/00; H02J 3/36; E21B 41/00

USPC ........................................................... 361/62
See application file for complete search history.

(56) References Cited

U.S. PATENT DOCUMENTS

| | | |
|---|---|---|
| 4,400,755 A | 8/1983 | Lezan |
| 5,910,888 A | 6/1999 | Weimers |
| 5,946,178 A | 8/1999 | Bijlenga |
| 6,191,536 B1 | 2/2001 | Dolmovich |

(Continued)

FOREIGN PATENT DOCUMENTS

| | | |
|---|---|---|
| CN | 103107549 A | 5/2013 |
| EP | 0164507 A1 | 12/1985 |

(Continued)

OTHER PUBLICATIONS

Lawatsch et al.,"Protection of thyristors against overvoltage with breakover diodes", Industry Applications, IEEE Transactions on,Issue Date: May/Jun. 1988, vol. 24, Issue: 3 pp. 444-448.

(Continued)

*Primary Examiner* — Scott Bauer
(74) *Attorney, Agent, or Firm* — Andrew J. Caruso (57) ABSTRACT

A high-voltage DC (HVDC) power system and a method of controlling and protecting the HVDC power system includes a plurality of sending-end (SE) modules coupled in electrical series and a plurality of receiving-end (RE) power converter modules electrically coupled to said plurality of SE modules, the RE modules coupled in a switchyard configuration, the switchyard configuration including a plurality of load branches coupled together in electrical series, each load branch including a branch bypass switch configured to bypass load current around an associated load branch, and a branch protection system.

20 Claims, 12 Drawing Sheets

(56) References Cited

U.S. PATENT DOCUMENTS

| | | |
|---|---|---|
| 6,707,171 B1 | 3/2004 | Huenner et al. |
| 7,072,196 B1 * | 7/2006 | Glidden et al. ............... 363/96 |
| 7,190,564 B2 * | 3/2007 | Yunus .......................... 361/91.7 |
| 7,199,990 B2 | 4/2007 | Huenner |
| 7,633,770 B2 | 12/2009 | Datta et al. |
| 7,851,943 B2 | 12/2010 | Datta et al. |
| 7,880,419 B2 | 2/2011 | Sihler et al. |
| 8,044,537 B2 | 10/2011 | Asplund et al. |
| 8,068,324 B2 | 11/2011 | Chiang |
| 2003/0016073 A1 * | 1/2003 | Gelman ......................... 327/447 |
| 2008/0252142 A1 | 10/2008 | Davies et al. |
| 2009/0295225 A1 * | 12/2009 | Asplund et al. ................. 307/31 |
| 2010/0008371 A1 | 1/2010 | Brekke et al. |
| 2010/0046255 A1 | 2/2010 | Paajarvi |
| 2010/0133901 A1 | 6/2010 | Zhang et al. |
| 2012/0217802 A1 | 8/2012 | Kanakasabai et al. |
| 2012/0268099 A1 | 10/2012 | Sihler et al. |

FOREIGN PATENT DOCUMENTS

| | | |
|---|---|---|
| EP | 0868002 B1 | 12/2008 |
| EP | 2067313 B1 | 6/2009 |
| EP | 2667498 A2 | 11/2013 |
| WO | 2012171891 A1 | 12/2012 |
| WO | 2012171995 A1 | 12/2012 |
| WO | 2013055238 A1 | 4/2013 |

OTHER PUBLICATIONS

International Search Report and Written Opinion issued in connection with corresponding PCT Application No. PCT/US2014/055062 dated Dec. 15, 2014.

Kotb et al., "A hybrid HVDC transmission system supplying a passive load", Electric Power and Energy Conference (EPEC), IEEE, Piscataway, NJ, USA, pp. 1-5, Aug. 25, 2010.

* cited by examiner

METHOD AND SYSTEM FOR ARCHITECTURE, CONTROL, AND PROTECTION SYSTEMS OF MODULAR STACKED DIRECT CURRENT SUBSEA POWER SYSTEM

STATEMENT REGARDING FEDERALLY SPONSORED RESEARCH & DEVELOPMENT

The U.S. Government has certain rights in this invention as provided for by the terms of Contract No. DE-AC26-07NT42677—RPSEA Sub Contract 08121-2901-01.

BACKGROUND OF THE DISCLOSURE

This description relates to power distribution systems, and, more particularly, to systems and methods for a high-voltage direct current (HVDC) transmission and distribution system control and protection.

As oil and gas fields in shallow waters go dry, producers are tapping offshore fields in deeper waters with oil installations that operate far below the surface of the sea. The typical equipment for such subsea oil recovery and production include gas compressors and various pumps for multiple functions. Electric variable speed drive (VSD) and motor systems are one way to power such equipment directly under the deep water. Therefore, the delivery of electric power from a remote onshore utility grid or power generation is important to secure a reliable production and processing of oil and gas in subsea locations. Typically, the transmission power requirement is approximately one hundred megawatts for medium to large oil/gas fields.

For applications wherein bulk power is transmitted over long distances to offshore locations, alternating current (AC) transmission faces technical challenges, which becomes more significant when transmission distance is in excess of one-hundred kilometers. The significant reactive power drawn from the distributed subsea cable capacitors restrains the power delivery capability as well as increases the system cost.

Direct current (DC) transmission is more efficient over longer distances than AC transmission. Medium voltage (MV) or high voltage (HV) DC transmission typically requires power electronic converters which are capable of converting between HV AC and HV DC. In conventional converter topologies, each switch of the converter is designed to handle high voltages which may range from tens of kilovolts to hundreds of kilovolts depending upon the application needs. Such switches are typically arranged with series connection of several semiconductor devices such as insulated gate bipolar transistors (IGBTs) and thyristors. Another method is to use switches within modules of lower voltage rating and achieving the high voltages required by connecting as many modules in series as the application requires. Due to the special application in subsea, receiving-end converters need to be designed on a modular-basis which is easy to transport, marinize, install, and retrieve.

BRIEF DESCRIPTION OF THE INVENTION

In one embodiment, a high-voltage DC (HVDC) power system includes one or more sending-end (SE) modules coupled in electrical series and one or more receiving-end (RE) power converter modules electrically coupled to said plurality of SE modules, the RE modules coupled in a switchyard configuration, the switchyard configuration including one or more load branches coupled together in electrical series, each load branch including a branch bypass switch configured to bypass load current around an associated load branch, and a branch protection system.

In another embodiment, a method of protecting and controlling a high voltage DC (HVDC) power system includes coupling a plurality of load distribution branch circuits to a receiving end (RE) power distribution system configured in a switchyard structure, each of the plurality of load distribution branch circuits includes a branch protection system, and an electrical load supplied with electrical power through an RE converter module and respective distribution cable, during a fault in one of the plurality of load distribution branch circuits, at least one of bypassing current around an open circuited load using a plurality of series-connected thyristors coupled in electrical parallel with the load, reducing a reverse voltage spike across the load in event of a ground fault using a diode connected anti-parallel across the load, and absorbing a transient current spike caused by a load-shedding event associated with another load connected to the switchyard structure using a resistor-capacitor-diode (RCD) circuit coupled across.

In yet another embodiment, a subsea receiving end (RE) assembly of a high-voltage DC (HVDC) power system includes one or more receiving-end (RE) power converter modules coupled in a switchyard configuration comprising a distribution load cable supplying electrical power to a distribution branch for each load and having respective distribution branch protective devices, each RE power converter module supplying a respective load with three-phase alternating current (AC) power for each branch of loads, each distribution branch including a bypass protection device, a current resonance damping circuit, and a diode connected anti-parallel with terminals of load distribution cables.

BRIEF DESCRIPTION OF THE DRAWINGS

FIGS. 1-13 show exemplary embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE INVENTION

The following detailed description illustrates embodiments of the invention by way of example and not by way of limitation. It is contemplated that the invention has general application to protection and control of electric power distribution systems in industrial, commercial, and residential applications.

Embodiments of the present disclosure relate to a distribution switchyard structure and its bypass device to protect system against open-circuit failure. Due to the operational principle of a modular stacked direct current (MSDC) subsea power system, open-circuit failure mode is regarded as the most critical failure event, which may lead to a catastrophic cascading system failure. The distribution switchyard structure reduces the effects of an open-circuit failures that may occur on any of the distribution cables as well as ride-through the ground-faults and fast load-shedding events. As a key component in the distribution switchyard, a high-voltage bypass device with high reliability includes a passive-component-triggering circuit capable of turning on a plurality of series-connected thyristors in a fast and uniform manner as protection against over-voltage. Without a requirement of using any control power, the proposed passive solution improves the system reliability and ensures turning on multiple-thyristors at the same time.

For the high voltage bypass with a high surge current capability and a fast turn-on behavior, a thyristor is one of the best options. The typical voltage of each receiving-end module is more than 10 kV, up to 30 kV. For such high-voltage applications, two or more thyristors in series are used. As such, the triggering unit to turn on thyristors at the same time is important. Active triggering using control sensing, pulse power supply, and fiber optics may be used. However, for subsea MSDC system applications, the reliability of the high voltage bypass device is important as a protection circuit. In the subsea harsh environment, such as high-temperature and high pressure, solely relying on electronics/control to turn on the series-connected thyristors may not be able to meet a long life-time target. Any of power supply loss, control unit malfunction, or electronic components failure can results in a failure to turn on the bypass thyristors. Therefore, using a passive scheme without any power supply or control to fulfill all the detection and protection function is desired.

Breakover diode (BOD) based triggering performs well to protect a single thyristor against over-voltage. It utilizes the energy from a snubber capacitor to fire the thyristor when the BOD breaks over. No active device is needed, which is robust and reliable. Although putting thyristors embedded with a BOD in series can help protect the individual thyristor against over-voltage, it cannot ensure that all thyristors are turned on at the same time due to part-to-part variations of the BODs. Moreover, such a system is a series-tied system. Any BOD failure results in overall failure of the bypass system. For example, if each BOD circuit reliability is a, the total reliability of N series-connected thyristors based on passive triggering is shown in (1), as being significantly smaller than an individual piece where N is the number of thyristors.

$$R_{total} = \alpha^N \quad (1)$$

The following description refers to the accompanying drawings, in which, in the absence of a contrary representation, the same numbers in different drawings represent similar elements.

Figure 1:
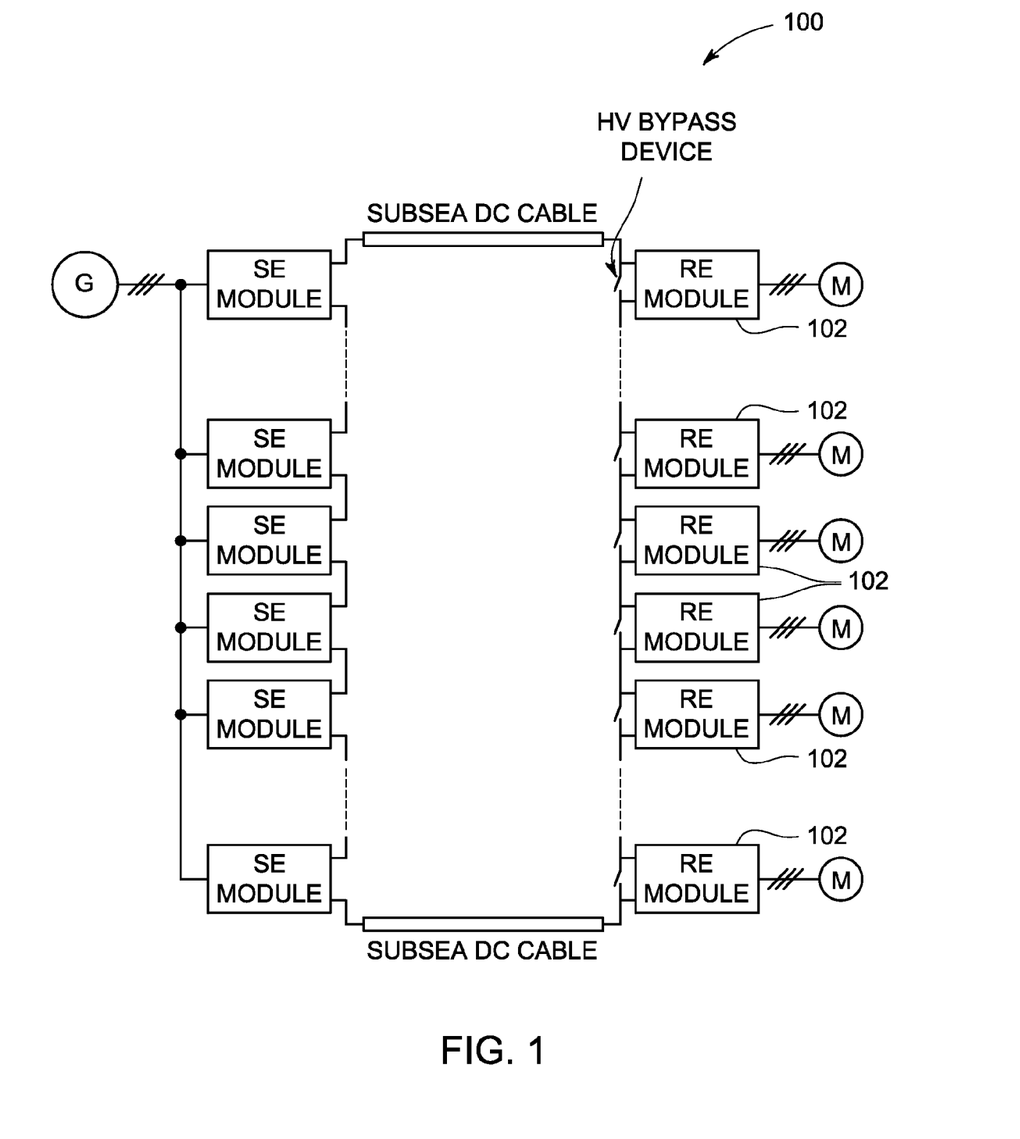
FIG. 1 is a schematic block diagram of a bipolar current-source based modular stack direct current (MSDC) high voltage direct current (HVDC) system 100.

FIG. 1 is a schematic block diagram of a bipolar current-source based modular stack direct current (MSDC) high voltage direct current (HVDC) system 100. In the example embodiment, all subsea receiving-end (RE) modules 102 are connected in electrical series. Any open-circuit fault in system 100 could result in a whole system shut-down, which greatly affects system reliability. To reduce the probability of such an event, an ultra-reliable bypass protection device is used to provide a bypass current path in the event that any RE module fails in an open-circuit mode. Bypassing the open-circuit quickly facilitates MSDC 100 surviving the open-circuit fault.

Figure 2:
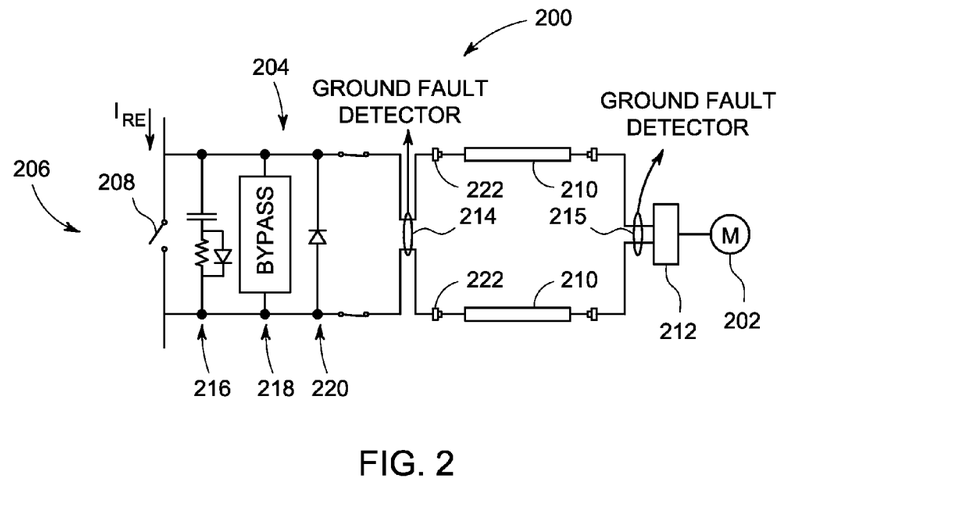
FIG. 2 is a schematic block diagram of a receiving-end distribution switchyard structure 200 used to supply power to subsea loads 202.

FIG. 2 is a schematic block diagram of a receiving-end distribution switchyard structure 200 used to supply power to subsea loads 202. In the example embodiment, a protection system 204 is implemented in the distribution switchyard structure 200 for each branch 206 of loads. Each branch 206 includes a bypass switch 208 in parallel with protection system 204, one or more branch distribution cables 210, RE module 212 and load 202. Each branch 206 may also include one or more common mode current sensors 214, 215 to facilitate detecting, localizing, and isolating a ground fault in branch 206. In various embodiments, bypass switch 208 may be a manually actuated switch or may be controlled automatically by control devices positioned locally with branch 206 or remotely, for example, at the sea surface proximate the sending end units.

Protection system 204 includes a resistor-capacitor-diode (RCD) snubber circuit 216, a bypass protection circuit 218, and an antiparallel connected diode 220. RCD snubber circuit 216 is used to absorb a transient current spike as load-shedding of a neighbor branch. RCD snubber circuit 216 is configured to reduce an over-voltage across bypass protection circuit 218 to prevent false-tripping due to such a load-shedding event. The transient current spike is caused by the energy damping from the transmission cables. Bypass protection circuit 218 uses fast solid-state thyristors (shown in FIG. 10) across inlet terminals 222 of distribution cables 210 to provide a bypass current path in case of an open-circuit in branch 206. Anti-parallel diode 220 is configured to reduce a high reversed voltage spike across bypass protection circuit 218 and reduce a sudden insulation stress polarity reverse on inlet terminals 222 when a ground fault occurs. In addition, ground fault detector devices, for example, current sensors 214, 215 are implemented in each terminal of switchyard structure 200 to quickly identify the fault location.

Figure 3:
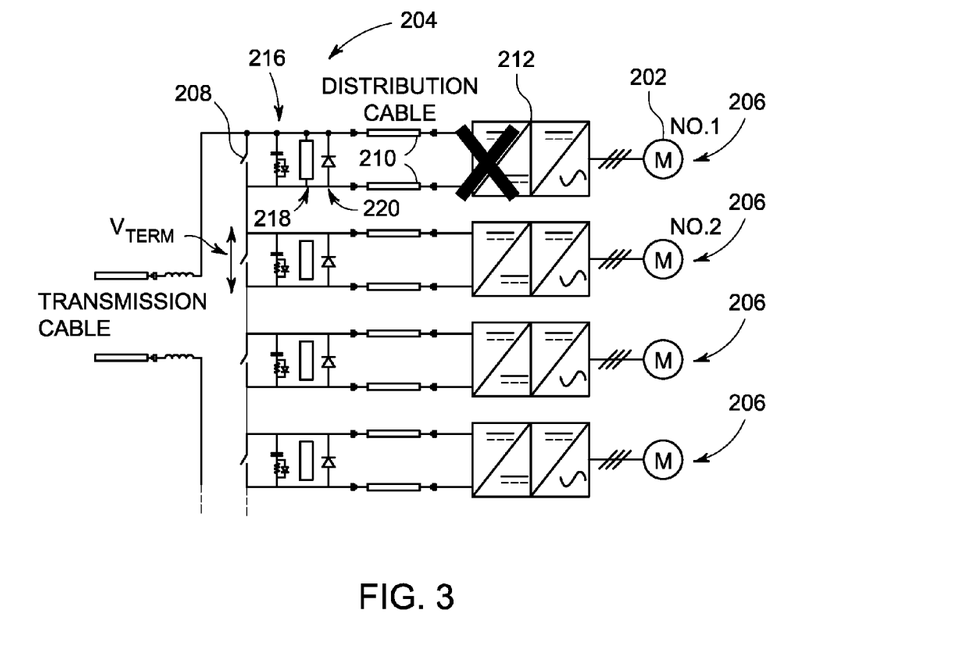
FIG. 3 is a schematic block diagram of a portion of receiving-end distribution switchyard structure 200 including a plurality of branches 206.
Figure 4:
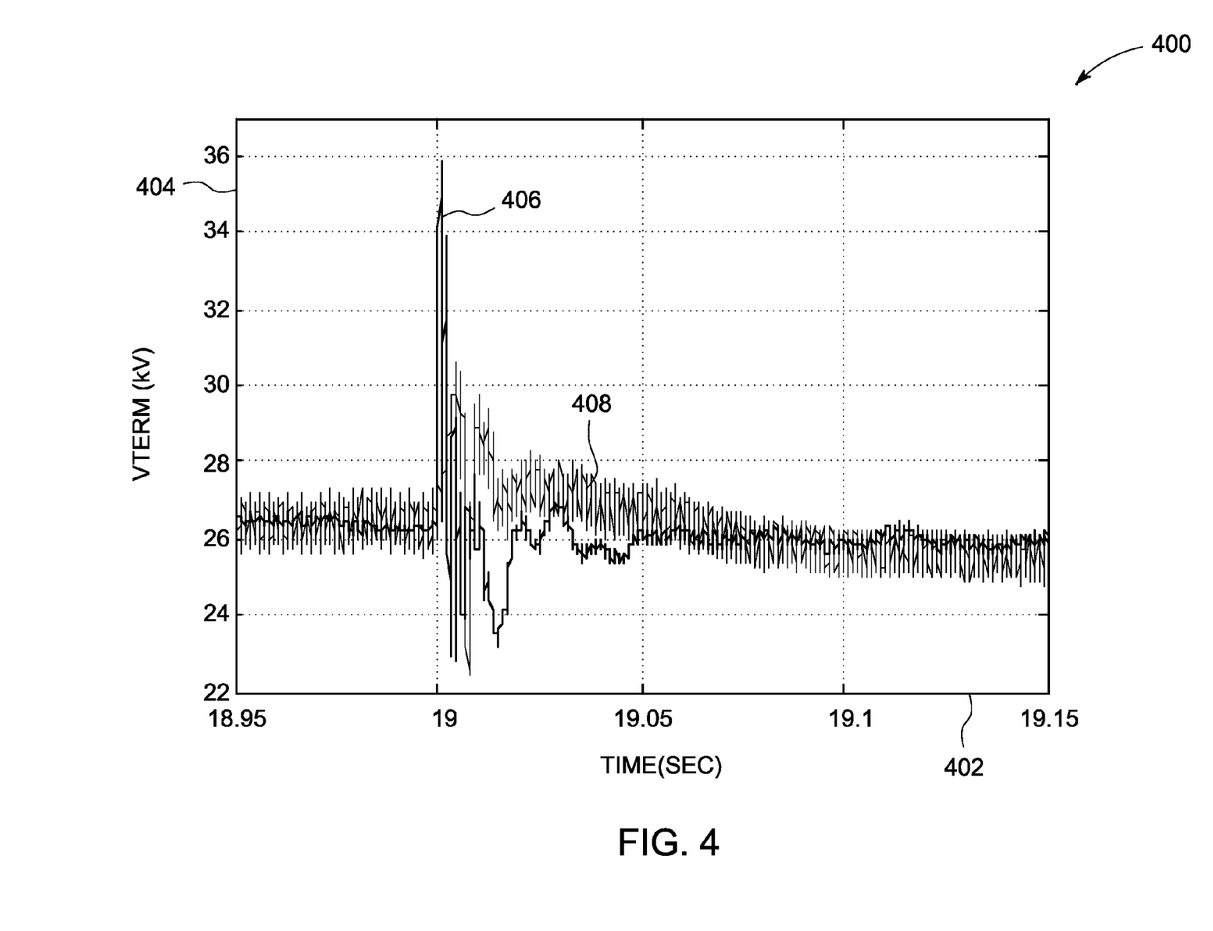
FIG. 4 is a graph 400 of voltage across branch No. 2 (shown in FIG. 3) during a transient induced by the load-shedding of branch No. 1 illustrated in FIG. 3.

FIG. 3 is a schematic block diagram of a portion of receiving-end distribution switchyard structure 200 including a plurality of branches 206. In the example embodiment, branch No. 1 supplies power, for example, to a 12 MW compressor load that has suddenly shut-down or bypassed. In such an event, without RCD snubber circuit 216 employed, the transient is shown in FIG. 4. The transient with RCD snubber circuit 216 employed in protection system 204 is also shown in FIG. 4.

FIG. 4 is a graph 400 of voltage across branch No. 2 (shown in FIG. 3) during a transient induced by the load-shedding of branch No. 1 illustrated in FIG. 3. Graph 400 includes an x-axis 402 graduated in units of time (seconds) and a y-axis 404 graduated in units of voltage (kV). A trace 406 illustrates the voltage across branch No. 2 when the load is shed on branch No. 1 without RCD snubber circuit 216 employed on branch No. 2. A trace 408 illustrates the voltage across branch No. 2 when the load is shed on branch No. 1 with RCD snubber circuit 216 employed on branch No. 2. In the example embodiment, the over-voltage spike is reduced from approximately 10 kV to approximately 3 kV, indicating how significant RCD snubber circuit 216 is in reducing the voltage spike.

Figure 5:
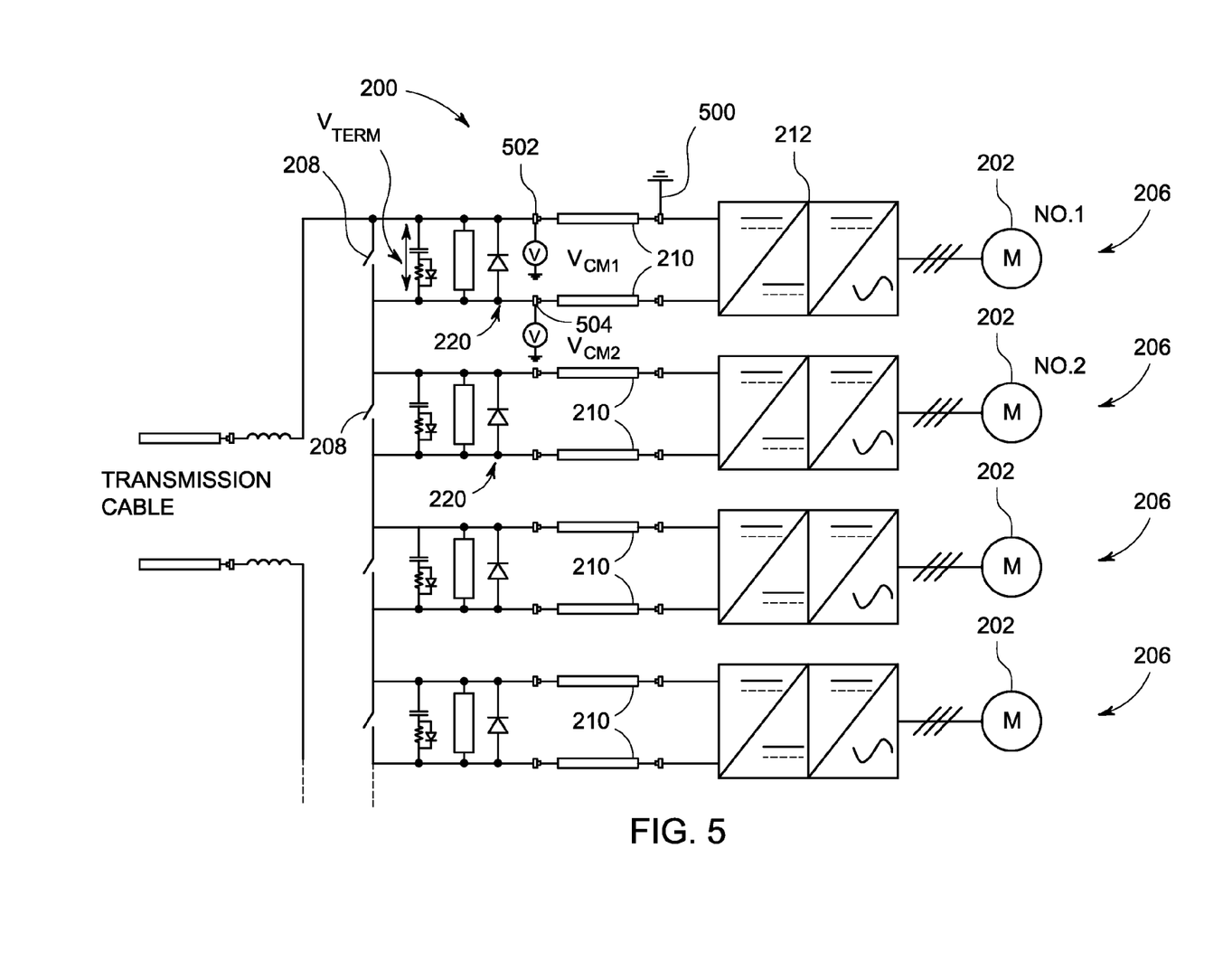
FIG. 5 is a schematic block diagram of a portion of the receiving-end distribution switchyard structure (shown in FIG. 2) including a plurality of branches 206.

FIG. 5 is a schematic block diagram of a portion of receiving-end distribution switchyard structure 200 including a plurality of branches 206. In the example embodiment, branch No. 1 supplies power, for example, to a 12 MW compressor load that has suddenly suffered a ground fault 500. Anti-parallel diode 220 facilitates avoiding a pronounced reversed voltage spike across bypass switch 208 that is produced during a ground fault. An amplitude of the voltage spike depends on, among other things, where the ground fault is located and an amount of total power consumption at the time of the fault. This reversed voltage occurs because the capacitances of local distribution cables 210 for each load 202 are discharged at different rates. In one embodiment, the voltage is measured at wet-met connectors 502 and 504.

Figure 6:
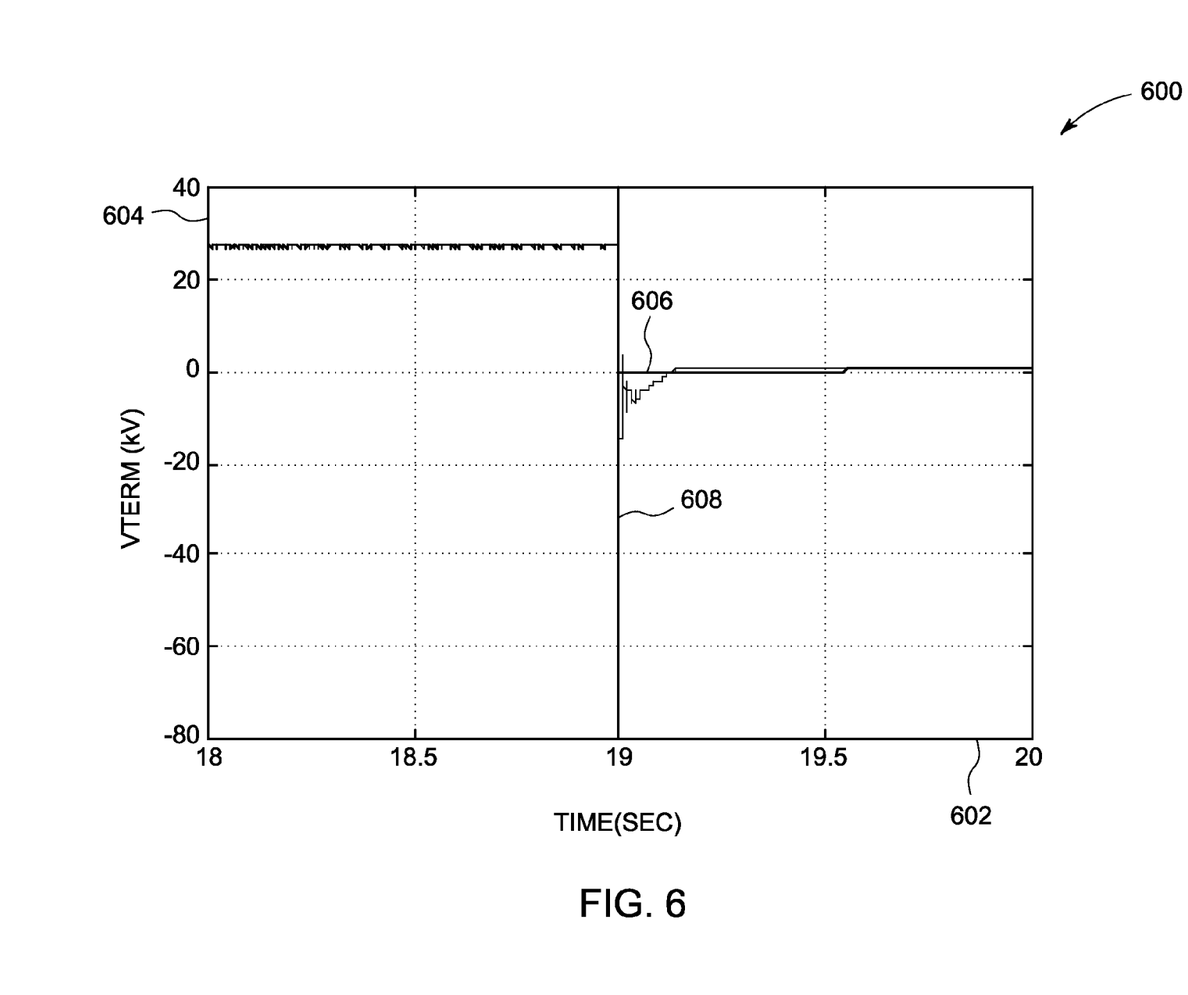
FIG. 6 is a graph of voltage across the bypass switch of No. 1 load branch during a transient induced by a ground fault in branch No. 1 illustrated in FIG. 5.

FIG. 6 is a graph 600 of voltage across bypass switch 208 of No. 1 load branch 206 during a transient induced by ground fault 500 in branch No. 1 illustrated in FIG. 5. Graph 600 includes an x-axis 602 graduated in units of time (seconds) and a y-axis 604 graduated in units of voltage (kV). A trace 606 illustrates the voltage across branch No. 1 when the ground fault occurs on branch No. 1 without anti-parallel diode 220 employed on branch No. 1. A trace 608 illustrates the voltage across branch No. 1 when the ground fault occurs on branch No. 1 with anti-parallel diode 220 employed on branch No. 2. In the example embodiment, the reverse-voltage spikes to approximately −80 kV which can damage bypass device 208, although the normal operation voltage is only about 27 kV.

Figure 7:
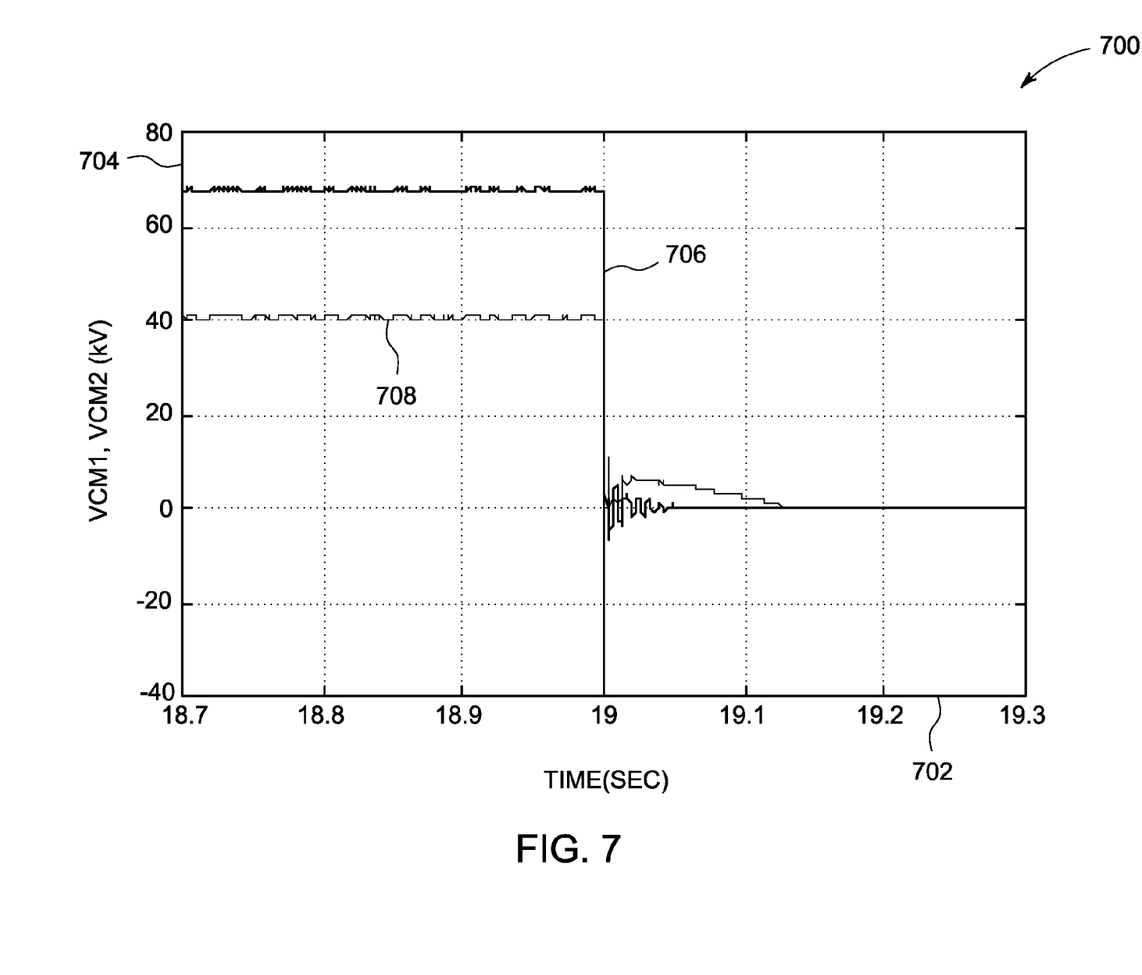
FIG. 7 is a graph of the insulation voltage stresses of two wet-met connectors shown in FIG. 5 of No. 1 load branch during a transient induced by a ground fault in branch No. 1 illustrated in FIG. 5.

FIG. 7 is a graph 700 of the insulation voltage stresses of two wet-met connectors 502 and 504 (shown in FIG. 5) of No. 1 load branch 206 during a transient induced by ground fault 500 in branch No. 1 illustrated in FIG. 5. Graph 700 includes an x-axis 702 graduated in units of time (seconds) and a y-axis 704 graduated in units of voltage (kV). A trace 706 illustrates the voltage stress at connector 502 (shown in FIG. 5) that suddenly reverses polarity when the ground fault occurs on branch No. 1 without anti-parallel diode 220 employed on branch No. 1. Connector 502 requires a greater dielectric strength to sustain this sudden polarity change. A trace 708 illustrates the voltage stress at connector 504 (shown in FIG. 5) when the ground fault occurs on branch No. 1 without anti-parallel diode 220 employed on branch No. 1.

Figure 8:
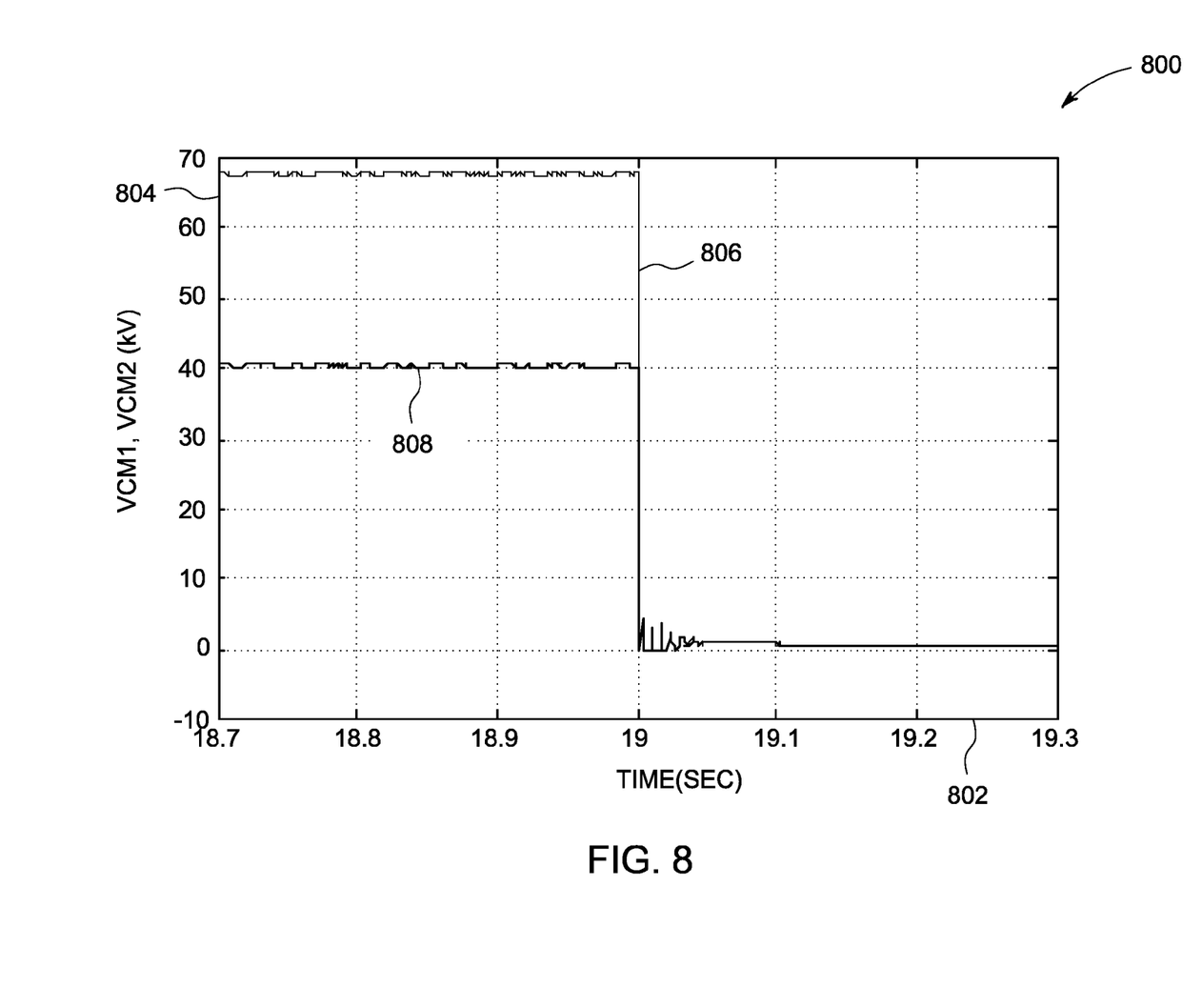
FIG. 8 is a graph of the insulation voltage stresses of two wet-met connectors shown in FIG. 5 of No. 1 load branch during a transient induced by a ground fault in branch No. 1 illustrated in FIG. 5.

FIG. 8 is a graph 700 of the insulation voltage stresses of two wet-met connectors 502 and 504 (shown in FIG. 5) of No. 1 load branch 206 during a transient induced by ground fault 500 in branch No. 1 illustrated in FIG. 5. Graph 800 includes an x-axis 802 graduated in units of time (seconds) and a y-axis 804 graduated in units of voltage (kV). A trace 806 illustrates the voltage stress at connector 502 (shown in FIG. 5) when the ground fault occurs on branch No. 1 with anti-parallel diode 220 employed on branch No. 1. Anti-parallel diode 220 effectively eliminates the high insulation voltage stress issue. A trace 808 illustrates the voltage stress at connector 504 (shown in FIG. 5) when the ground fault occurs on branch No. 1 with anti-parallel diode 220 employed on branch No. 1.

Figure 9:
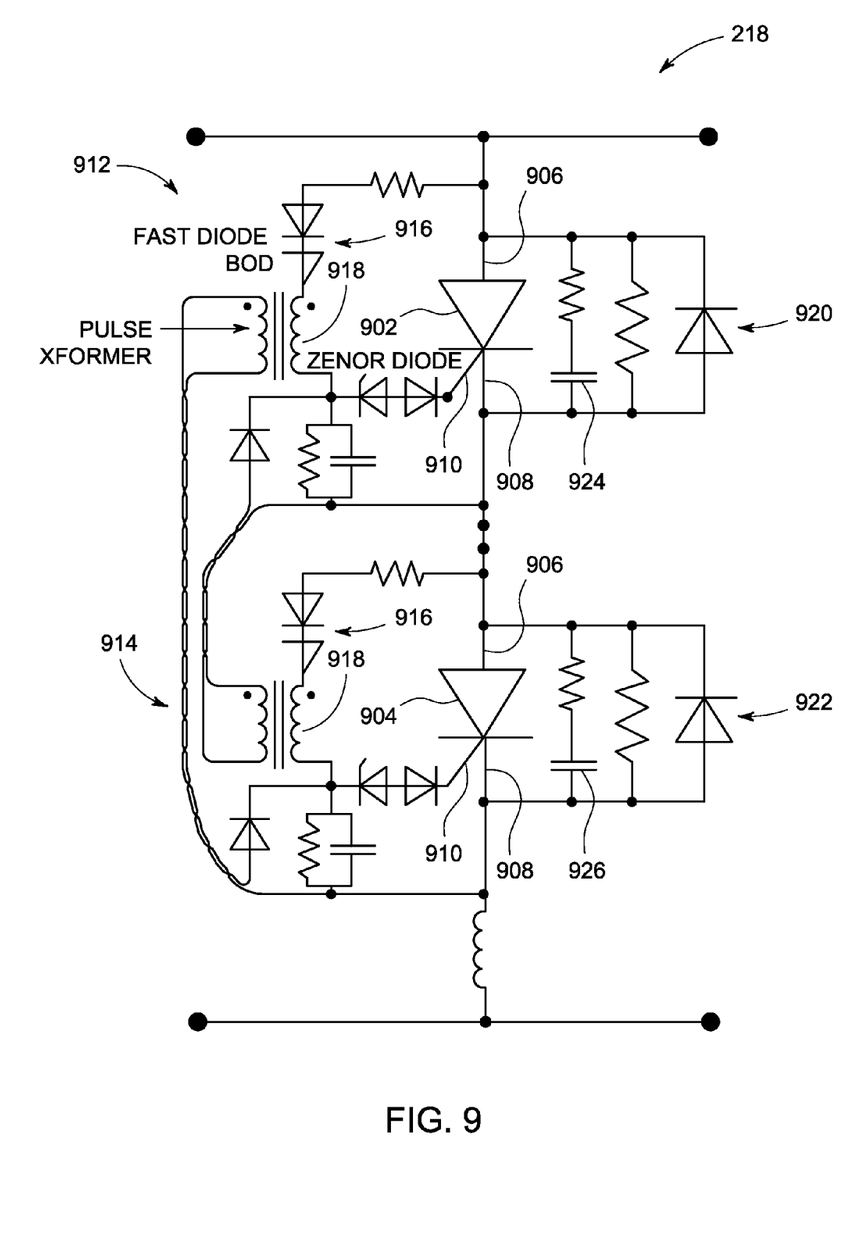
FIG. 9 is a schematic diagram of the bypass protection circuit shown in FIG. 2 illustrating an example using two thyristors in series as a high-voltage bypass device.

FIG. 9 is a schematic diagram of bypass protection circuit 218 (shown in FIG. 2) illustrating an example using two thyristors 902 and 904 in series as a high-voltage bypass device. Each of thyristors 902 and 904 include an anode 906, a cathode, 908 and a gate 910. Thyristors 902 and 904 are triggered by respective triggering circuits 912 and 914. Triggering circuits 912 and 914 each includes a breakover diode (BOD) 916 and a pulse transformer 918 coupled in electrical series across an anode/gate circuit of thyristors 902 and 904. Respective balancing resistors and snubber circuit 920 and 922 cause thyristors 902 and 904 to share the branch voltage approximately equally. Balancing resistors and snubber circuit 920 and 922 each include a snubber capacitor 924. With pulse transformer 918 inserted in BOD loop 916, as soon as BOD 916 breaks over, the BOD current flows through pulse transformer 918. Then a pulse current is injected into triggering circuit 914 of thyristor 904 by pulse transformer 918. Therefore, any BOD's breakover can trigger all thyristors at the same time. Even if the self-embedded BOD 916 fails, thyristor 904 can be still triggered by other BODs, in a case of multiple thyristor circuits connected in series.

Figure 10:
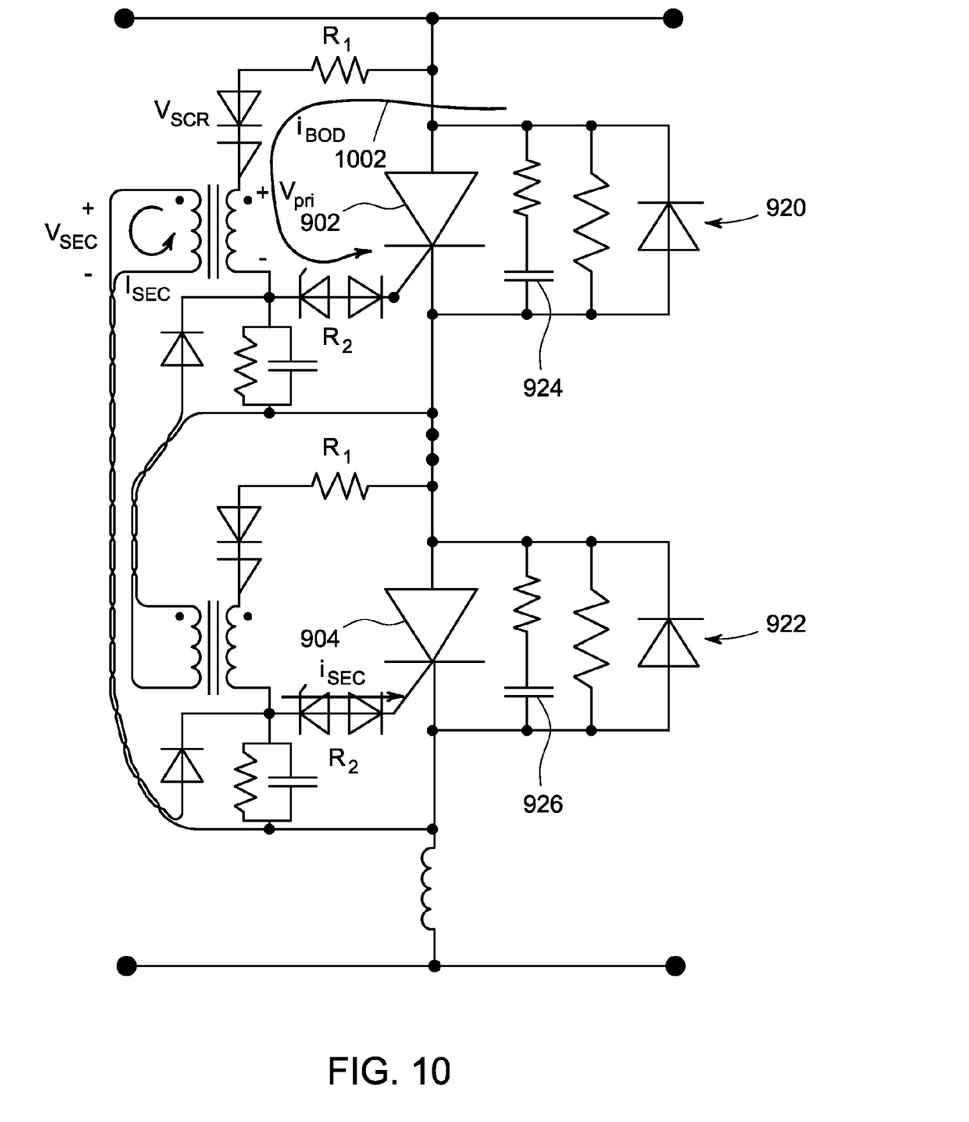
FIG. 10 is a schematic diagram of the bypass protection circuit shown in FIG. 2 illustrating a single BOD turning on all series connected thyristors.

FIG. 10 is a schematic diagram of bypass protection circuit 218 (shown in FIG. 2) illustrating a single BOD 916 turning on all series connected thyristors. Although shown using just two thyristors for clarity, any number of thyristors may be turned on from a single BOD 916 in other embodiments. Assuming, for example, that BOD 902 breaks over first, its voltage suddenly drops to almost zero, snubber capacitor 924 will discharge energy through a BOD loop that includes BOD 916 and pulse transformer 918 (shown by line 1002).

The BOD current, $i_{BoD}$ is determined as shown in (2). As the primary winding voltage of the pulse transformer (turn ratio is 1) $v_{pri}$ is the same as the gate voltage of the other thyristor, which is very much lower than the breakover voltage level of the BOD, $v_{scr}$, $v_{pri}$ can be ignored in (2).

$$i_{BOD} = \frac{v_{scr} - v_{pri}}{R_1 + R_2} \approx \frac{v_{scr}}{R_1 + R_2} \quad (2)$$

According to FIG. 10, the induced current on the secondary side of transformer $i_{sec}$ will be almost the same as the BOD current $i_{BOD}$.

$$i_{sec} \approx i_{BOD} \quad (3)$$

Therefore, gate current appears on both thyristors and force them to turn on. Because the gate energy needed to turn on a thyristor is not large, the stored energy in single snubber capacitor 924 is enough to fire all thyristors 904 plus others if there are more than two thyristors connected in series.

Since any BOD's breakover in the system can trigger all thyristors, the reliability can be dramatically increased making the bypass circuit 218 suitable for applications like subsea power system 100. Assuming the each BOD trigger circuit reliability is a, the total reliability of the bypass system is shown in (4), where N is the number of thyristors. It can be seen that the triggering circuit essentially becomes as a parallel-system, though thyristors are tied in series. The parallel system reliability can be improved dramatically.

$$R_{total}=1-(1-\alpha)^N$$

Figure 11:
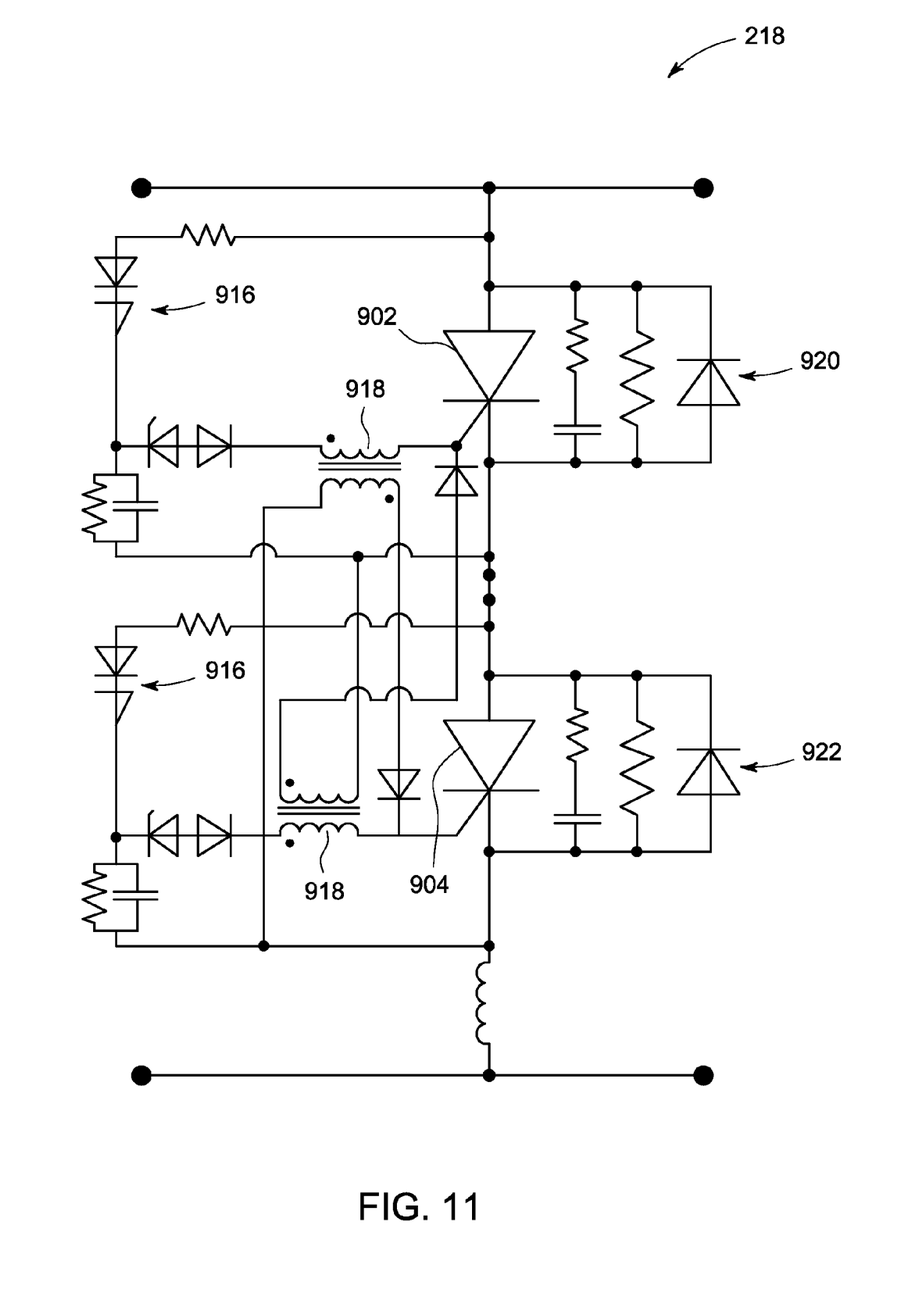
FIG. 11 is a schematic diagram of the bypass protection circuit shown in FIG. 2 in accordance with other example embodiments of the present disclosure.
Figure 12:
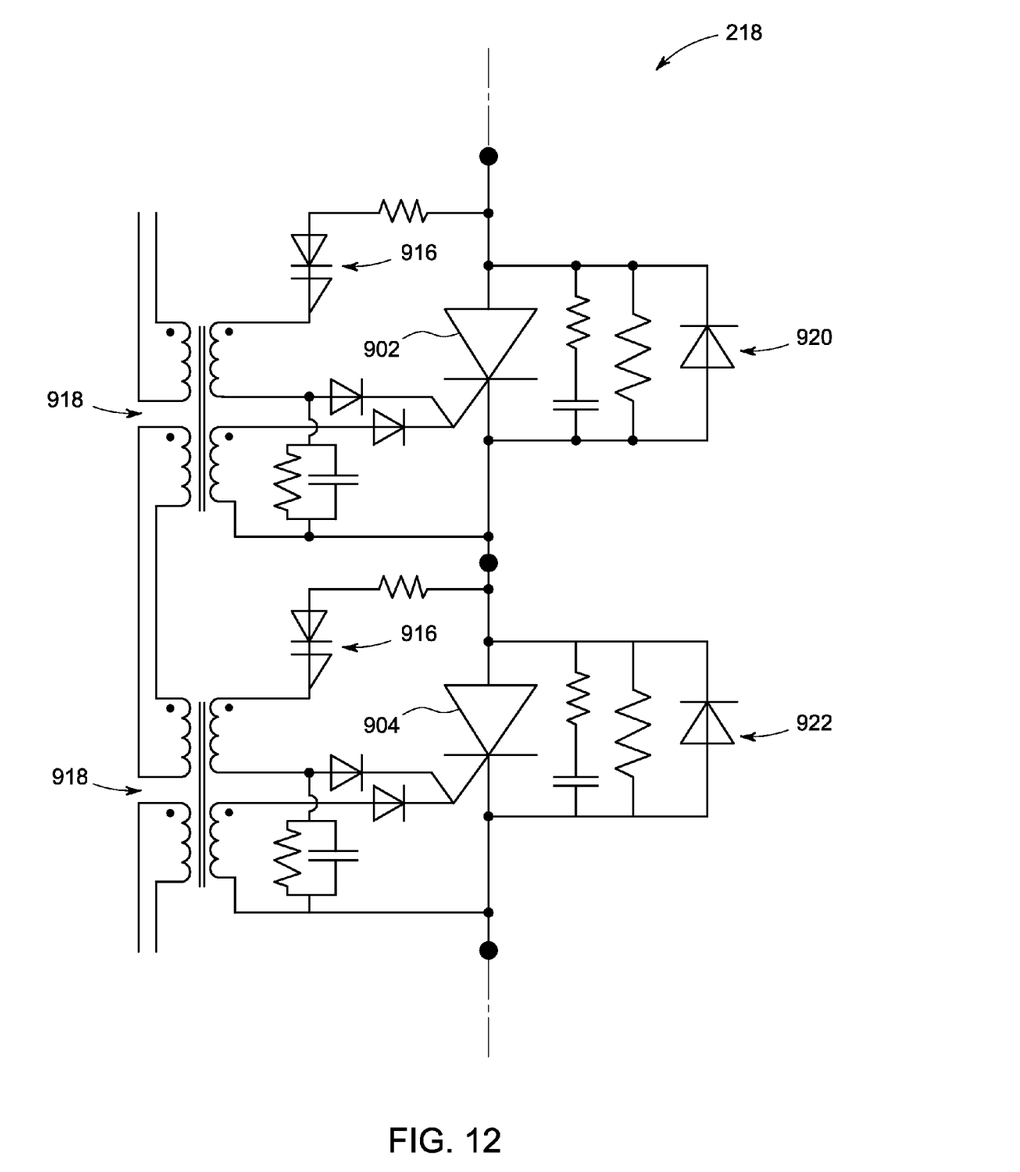
FIG. 12 is a schematic diagram of the bypass protection circuit shown in FIG. 2 in accordance with another example embodiment of the present disclosure.
Figure 13:
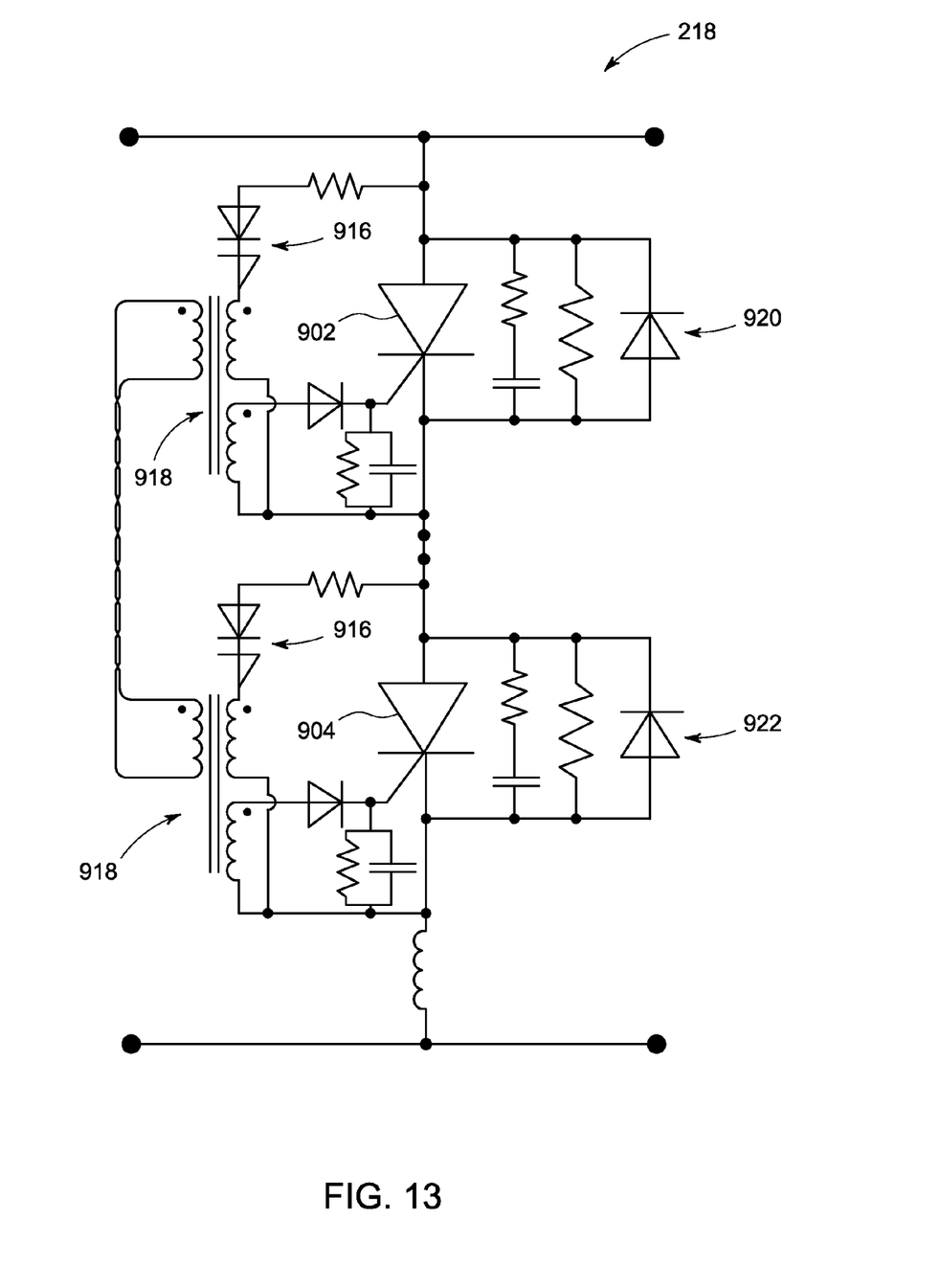
FIG. 13 is a schematic diagram of the bypass protection circuit shown in FIG. 2 in accordance with another example embodiment of the present disclosure.

FIGS. 11, 12, and 13 are schematic diagrams of bypass protection circuit 218 (shown in FIG. 2) in accordance with other example embodiments of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A high-voltage DC (HVDC) power system comprising:
one or more sending-end (SE) modules coupled in electrical series; and
one or more receiving-end (RE) power converter modules electrically coupled to said plurality of SE modules, the RE modules coupled in a switchyard configuration, the switchyard configuration including a plurality of load branches coupled together in electrical series, each load branch including:
a branch bypass switch configured to bypass load current around a respective one of the plurality of load branches; and
a branch protection system including a branch bypass protection device configured to detect an open circuit in the branch and to open the branch bypass switch.

2. The system of claim 1, wherein the branch protection system comprises:
an anti-parallel diode configured to reduce a spike of a reversed high voltage across the branch bypass switch and the branch protection system when a ground fault occurs; and
a current resonance damping circuit configured to absorb a transient current spike generated by an adjacent load branch as a load-shedding event of the adjacent load branch occurs.

3. The system of claim 2, wherein the current resonance damping circuit facilitates reducing an over-voltage across the branch bypass protection device to prevent false-tripping of the branch bypass protection device.

4. The system of claim 2, wherein the current resonance damping circuit comprises a resistive-capacitive-diode network electrically coupled across an inlet of the load distribution cable.

5. The system of claim 2, wherein the branch bypass protection device comprises one or more thyristors.

6. The system of claim 2, wherein the branch bypass protection device comprises:
two or more thyristors coupled in electrical series; and
a passive triggering circuit configured to trigger a remainder of the two or more thyristors on when a first of the two or more thyristors turns on.

7. The system of claim 6, wherein the passive triggering circuit comprises a primary winding of a first pulse transformer coupled in electrical parallel with a first of the two or more thyristors, a secondary winding of the first pulse transformer coupled to a gate-cathode triggering circuit of each of the remainder of the two or more thyristors.

8. The system of claim 6, wherein the passive triggering circuit is configured to trigger a remainder of the two or more thyristors to turn on when one of the two or more thyristors turns on.

9. A method of controlling and protecting a high voltage DC (HVDC) power system comprising:
coupling a plurality of load distribution branch circuits to a receiving end (RE) power distribution system configured in a switchyard structure, each of the plurality of load distribution branch circuits includes a branch protection system having a branch bypass switch configured to bypass load current around a respective one of the plurality of load distribution branches, the branch bypass protection device configured to detect an open circuit in respective of the load distribution branches, and an electrical load supplied with electrical power through an RE converter module and respective distribution cable;
during a fault in one of the plurality of load distribution branch circuits, at least one of:
bypassing current around an open circuited load using a plurality of series-connected thyristors coupled in electrical parallel with the load to open the branch bypass switch;
reducing a reverse voltage spike across the load in event of a ground fault using a diode connected anti-parallel across the load; and
absorbing a transient current spike caused by a load-shedding event associated with another load connected to the switchyard structure using a resistor-capacitor-diode (RCD) circuit coupled across.

10. The method of claim 9, wherein bypassing current around an open circuited load comprises:
sensing an increase in voltage drop across one or more of the plurality of series connected thyristors;
turning on at least one of the plurality of series connected thyristors due to the increase in voltage drop;
sensing an increase in current flow through the at least one thyristor; and
triggering at least one other thyristor of the plurality of series connected thyristors to turn on using the increased current flow.

11. The method of claim 9, further comprising coupling the receiving end (RE) power distribution system to a plurality of sending-end (SE) modules coupled together in electrical series.

12. The method of claim 11, further comprising:
positioning the plurality of SE modules above a surface of a body of water; and
positioning the receiving end (RE) power distribution system proximate a bed of the body of water.

13. A subsea receiving end (RE) assembly of a high-voltage DC (HVDC) power system comprising:
one or more receiving-end (RE) power converter modules each supplying a respective load, the RE modules coupled in a switchyard configuration comprising a distribution load cable supplying electrical power to a distribution branch for each respective load, each RE power converter module supplying the respective load with three-phase alternating current (AC) power, each distribution branch comprising:

a bypass protection device comprising one or more bypass devices configured to bypass a current around a load branch during an open-circuit event affecting the load branch;

a current resonance damping circuit; and a diode connected anti-parallel with terminals of the load distribution cables.

14. The system of claim 13, wherein the bypass protection device comprises the one or more bypass devices coupled in electrical parallel with terminals of a respective load distribution cable.

15. The system of claim 13, wherein the bypass protection device comprises a plurality of thyristors coupled in electrical series each having a passive triggering circuit.

16. The system of claim 15, wherein the passive triggering circuit comprises a breakover diode in electrical series with a primary winding of a transformer.

17. The system of claim 15, wherein the passive triggering circuit comprises a breakover diode in electrical series with a primary winding of a transformer in electrical parallel with an anode-gate circuit of a respective one of the plurality of thyristors.

18. The system of claim 13, wherein the bypass protection device comprises a plurality of thyristors coupled in electrical series each having a passive triggering circuit electromagnetically coupled to each other passive triggering circuit, wherein turning on of one thyristor turns on all others of the plurality of thyristors.

19. The system of claim 13, wherein the current resonance damping circuit comprises a snubber circuit comprising a resistor, a capacitor, and a diode (RCD) in series-parallel across a respective load branch cable, the snubber circuit configured to absorb a transient current spike when load-shedding occurs in another load branch, the RCD snubber circuit further configured to reduce an over-voltage across the bypass protection device to prevent false-tripping due to such a load-shedding event.

20. The system of claim 13, wherein the anti-parallel connected diode is configured to:

reduce a high reversed voltage spike across terminals of a respective bypass protection device during a ground fault on the respective branch; and reduce an insulation stress polarity reversal on branch electrical terminals during the ground fault.

* * * * *